US012574759B2

(12) United States Patent　　　　(10) Patent No.: US 12,574,759 B2
Guduru et al.　　　　　　　　　　(45) Date of Patent:　　Mar. 10, 2026

(54) SYSTEMS AND METHODS FOR TIME-SENSITIVE NETWORKING ANALYTICS

(71) Applicant: Verizon Patent and Licensing Inc., Basking Ridge, NJ (US)

(72) Inventors: Vijayakrishna P. Guduru, Denville, NJ (US); Sudhakar Reddy Patil, Flower Mound, TX (US); Anthony Clay Reynolds, Rhome, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 420 days.

(21) Appl. No.: 17/726,586

(22) Filed: Apr. 22, 2022

(65) Prior Publication Data

US 2023/0345264 A1　　Oct. 26, 2023

(51) Int. Cl.
H04W 24/02　　　(2009.01)
H04J 3/06　　　　(2006.01)
H04W 56/00　　　(2009.01)

(52) U.S. Cl.
CPC ........... H04W 24/02 (2013.01); H04J 3/0667 (2013.01); H04W 56/001 (2013.01)

(58) Field of Classification Search
CPC .............................. H04W 24/02; H04J 3/0667
See application file for complete search history.

(56) References Cited

U.S. PATENT DOCUMENTS

| | | | | |
|---|---|---|---|---|
| 2020/0137615 | A1* | 4/2020 | Joseph .............. | H04W 28/0257 |
| 2022/0022090 | A1* | 1/2022 | Schliwa-Bertling ........................ | |
| | | | | H04L 41/5009 |
| 2022/0046570 | A1* | 2/2022 | Moon .................... | H04J 3/0644 |
| 2022/0174625 | A1* | 6/2022 | Xiong .................... | H04W 48/18 |
| 2022/0361120 | A1* | 11/2022 | Kim .................... | H04W 56/001 |
| 2023/0100543 | A1* | 3/2023 | Andres Maldonado ..................... | |
| | | | | H04J 3/0667 |
| | | | | 370/503 |
| 2023/0318913 | A1* | 10/2023 | Sivasiva Ganesan .. | H04L 65/40 |
| | | | | 370/328 |

* cited by examiner

*Primary Examiner* — Michael J Moore, Jr.
*Assistant Examiner* — Sang C Lee

(57) ABSTRACT

Systems and methods described herein provide an interface for an Network Data Analytics Function (NWDAF) to extract events from a Time Sensitive Communication Time Synchronization Function (TSCTSF) when operators deploy Time Sensitive Networking (TSN) for a given network slice. An NWDAF in a core network receives an information request for a TSN service and sends, to a TSCTSF, a data request based on the information request. The NWDAF receives event data responsive to the data request and generates an analytics report based on the event data.

20 Claims, 6 Drawing Sheets

275

Messaging Framework 410

TSN Data Segregator 420

TSN Analytics Environment 430

500

| NF 510 | NWDAF 275 | TSCTSF 235 |

Analytics Request 520
Nnwdaf_AnalyticsSubscription_Subscribe
(Analytics ID = Service Experience)

Data Request 530
Ntsctsf_EventExposure_Subscribe
(Event ID = 5QI Statistics)

Data Notification 540
Ntsctsf_EventExposure_Notify

Apply/Train
Model
545

Analytics Report 550
Nnwdaf_AnalyticsSubscription_Notify
(estimated Service Experience)

SYSTEMS AND METHODS FOR TIME-SENSITIVE NETWORKING ANALYTICS

BACKGROUND

A Fifth Generation system (5GS) may include a core network that supports and manages 5G radio access networks (RANs), providing various services and enabling connections to other networks (e.g., connections to the Internet, etc.). The 5GS may support real-time applications and services, in conjunction with other networks, through time-sensitive networking (TSN). TSN is a mechanism for time-sensitive transmission of data including, for example, methods for time synchronization and traffic management to enable deterministic communications.

DETAILED DESCRIPTION OF EXAMPLE EMBODIMENTS

The following detailed description refers to the accompanying drawings. The same reference numbers in different drawings may identify the same or similar elements.

The Time Sensitive Communication Time Synchronization Function (TSCTSF) is a Time Sensitive Networking (TSN)-related core network function for 5GS. The TSCTSF controls the Device Side TSN Translators (DS-TT) and Network Side TSN Translators (NW-TT) for the Generalized Precision Time Protocol ((g) PTP)-based time synchronization service. In addition, the TSCTSF supports Time Sensitive Communication (TSC) assistance container-related functionalities for TSN. For example, TSCTSF may provide TSC Assistance Information (TSCAI) that describes TSC traffic characteristics for use in the 5GS for TSN.

A Network Data Analytics Function (NWDAF) is an operator-managed network analytics logical function defined for 5GS. The NWDAF may be responsible for providing network analysis information in response to requests from network functions. For example, NWDAF can provide 5G analytics, closed loop automation, and machine learning. Thus, the NWDAF provides a vendor agnostic solution for end-to-end analytics that consumes metrics and events from 5GC network functions (NFs) and operations, administration, and maintenance (OAM) platforms.

TSN services may be implemented in a network slice for the 5GS. A "network slice" may encompass an end-to-end virtual network with dedicated or shared storage and/or computation resources and may be configured to implement different quality of service (QoS) requirements. A network slice for a TSN session may be referred to as a "TSN slice." Currently, when operators deploy the NWDAF to obtain key performance indicators (KPIs) and another metrics, the NWDAF cannot include any event/traffic data from the TSCTSF. Currently, there is no standardized interface to extract metrics from TSCTSF when a TSN Slice is deployed for industrial communications. There is also no standardized interface to support TSCTSF-NWDAF exchanges.

Systems and methods described herein may provide an interface for the NWDAF to extract events from TSCTSF when operators deploy TSN for a given slice type. The NWDAF in a 5G core will have the intelligence to determine when (e.g., based on network slice selection assistance information (NSSAI) of a TSN slice) to collect events from the TSCTSF. According to an implementation, an NWDAF in a core network receives an information request for a TSN service and sends, to a TSCTSF, a data request based on the information request. The NWDAF receives from the TSCTSF event data responsive to the data request and generates an analytics report based on the event data.

Figure 1:
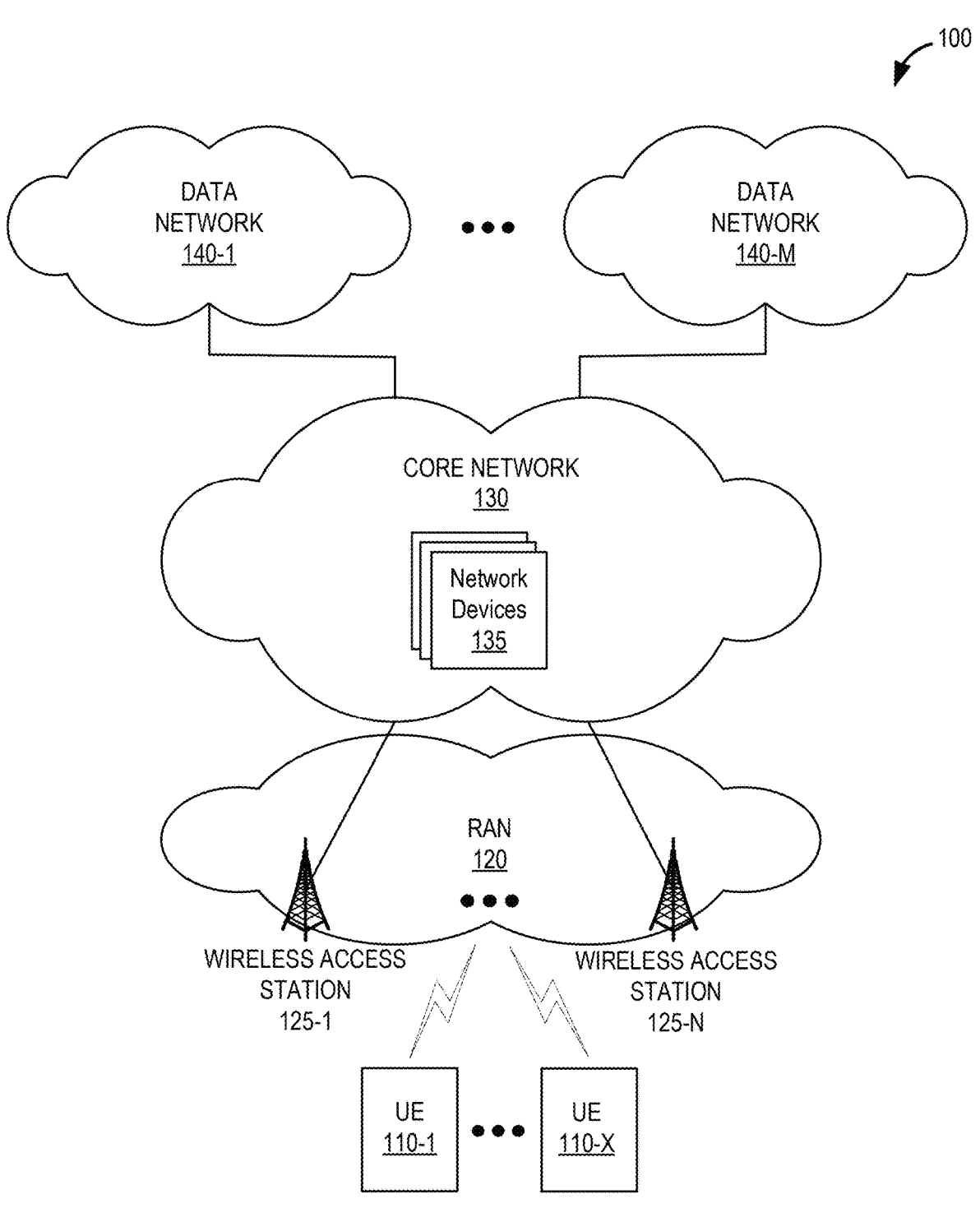
FIG. 1 is a diagram that depicts an exemplary network environment in which systems and methods described herein may be implemented.

FIG. 1 is a diagram of an example environment 100 in which the systems and/or methods, described herein, may be implemented. As shown in FIG. 1, environment 100 may include user equipment (UE) devices 110-1 to 110-X (referred to herein collectively as "UE devices 110" and individually as "UE device 110"), a radio access network (RAN) 120, a core network 130, and data networks 140-1 to 140-M. RAN 120, core network 130, and data network 140 may be collectively referred to as a transport network.

UE device 110 may include any device with long-range (e.g., cellular or mobile wireless network) wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player, a WiFi access point, Fixed wireless access (FWA) device, a smart television, etc.; a portable gaming system; global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic delivery, and/or other types of capabilities. In some implementations, UE device 110 may communicate using machine-to-machine (M2M) communication, such as machine-type communication (MTC), and/or another type of M2M communication. In still other implementations, UE device 110 may include a Redcap (Reduced capability) device that is used for applications such as industrial wireless sensors.

RAN 120 may enable UE devices 110 to connect to core network 130 for mobile telephone service, Short Message Service (SMS), Multimedia Message Service (MMS), Internet access, cloud computing, and/or other types of data services. RAN 120 may include wireless access stations 125-1 to 125-N. Each wireless access station 125 may service a set of UE devices 110. For example, wireless access station 125-1 may service some UE devices 110 when the UE devices 110 are located within the geographic area serviced by wireless access station 125-1, while other UE devices 110 may be serviced by another wireless access station 125 when the UE devices 110 are located within the geographic area serviced by the other wireless access station 125.

Wireless access station 125 may include a 5G base station (e.g., a gNB) that includes one or more radio frequency (RF) transceivers configured to send and receive 5G NR wireless signals. According to an implementation, a wireless access station 125 may include a gNB or its equivalent with multiple distributed components, such as a central unit (CU), a distributed unit (DU), a remote unit (RU or a remote radio unit (RRU)), or another type of component to support distributed arrangements. In some implementations, wireless access station 125 may also include a 4G base station (e.g., an eNodeB). Furthermore, in some implementations, wireless access station 125 may include a Multi-Access Edge Computing (MEC) system that performs cloud computing and/or provides network processing services for UE devices 110.

Core network 130 may manage communication sessions for UE devices 110. Core network 130 may provide mobility management, session management, authentication, and packet transport, to support wireless communication services for UE devices 110. Core network 130 may further provide access to data networks 140. Core network 130 may be compatible with known wireless standards which may include, for example, 3GPP 5G (non-standalone (NSA) and standalone (SA)), LTE, LTE Advanced, Global System for Mobile Communications (GSM), etc. For example, core network 130 may establish an Internet Protocol (IP) connection between UE device 110 and a particular data network 140. Core network 130 may include various types of network devices 135, which may implement different network functions described further herein.

Data networks 140-1 to 140-M (referred to herein collectively as "data networks 140" and generically as "data network 140") may each include a packet data network. A particular data network 140 may include, and/or be connected to and enable communication with, a local area network (LAN), a wide area network (WAN), a metropolitan area network (MAN), an optical network, a cable television network, a satellite network, a wireless network, an intranet, or a combination of networks. Some or all of a particular data network 140 may be managed by a communication services provider that also manages core network 130, RAN 120, and/or particular UE devices 110. For example, in some implementations, a particular data network 140 may include an IP Multimedia Sub-system (IMS) network (not shown in FIG. 1). An IMS network may include a network for delivering IP multimedia services and may provide media flows between two different UE devices 110, and/or between a particular UE device 110 and external IP networks or external circuit-switched networks (not shown in FIG. 1).

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
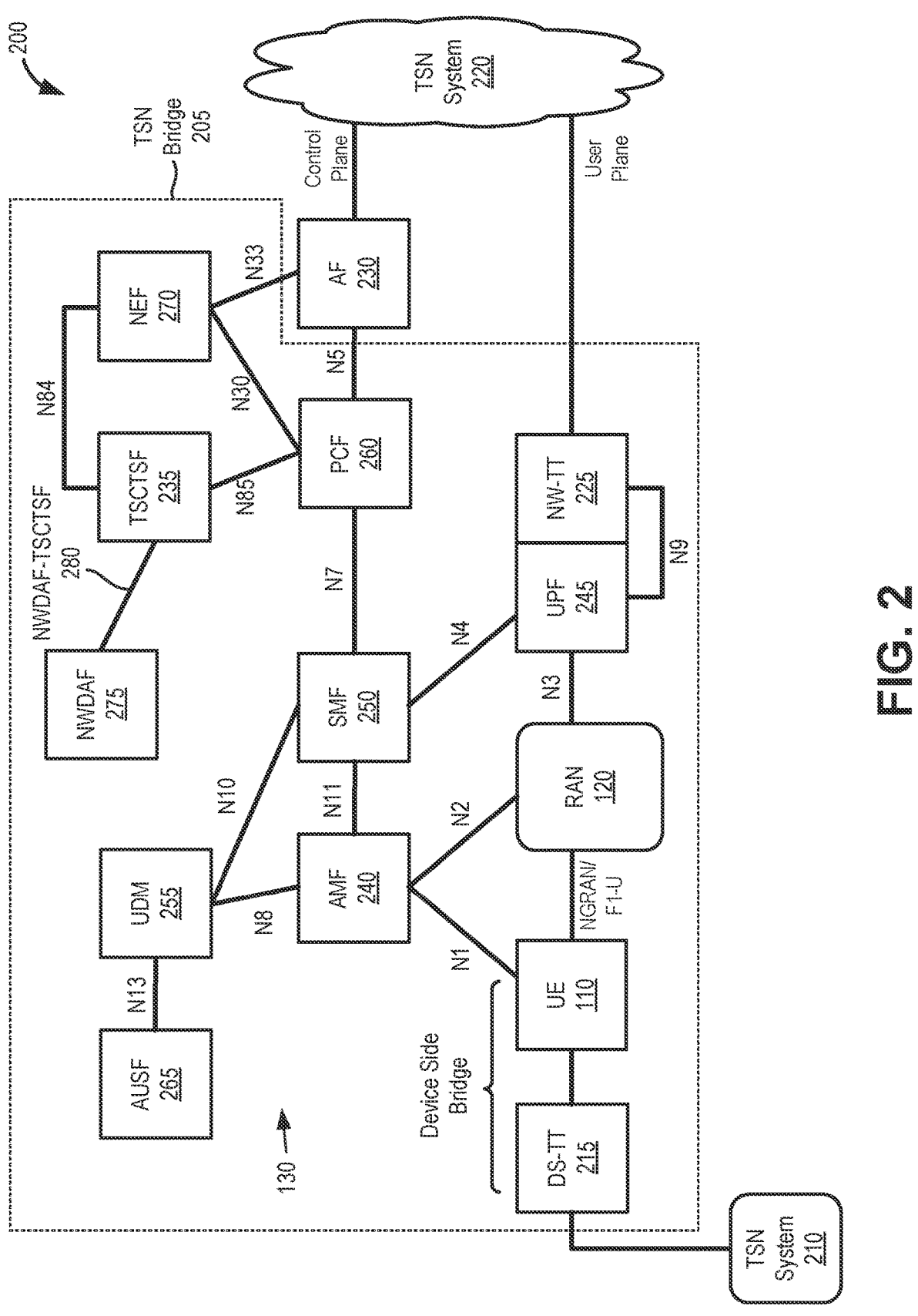
FIG. 2 is a diagram illustrating a network portion in the context of a time-sensitive networking (TSN) architecture, according to an implementation described herein.

FIG. 2 is a diagram illustrating a network portion 200 that includes exemplary components of environment 100 in the context of a TSN architecture, according to an implementation described herein. As shown in FIG. 2, system 200 may include a UE device 110, RAN 120, a first TSN system 210, a Device Side TSN Translators (DS-TT) 215, a second TSN system 220, and Network Side TSN Translator (NW-TT) 225, an AF 230, a TSCTSF 235, and various other components of core network 130 described below. While FIG. 2 depicts a single instance of the network functions in network portion 200 for illustration purposes, in practice, there may be multiple instances of one or more network functions.

The components depicted in FIG. 2 may be implemented as dedicated hardware components (e.g., network devices 135) or as virtualized functions implemented on top of a common shared physical infrastructure using software defined networking (SDN). For example, an SDN controller may implement one or more of the components of FIG. 2 using an adapter implementing a VNF virtual machine, a containerized network function (CNF) container, an event driven serverless architecture interface, and/or another type of SDN architecture. The common shared physical infrastructure may be implemented using one or more devices 300 described below with reference to FIG. 3 in a cloud computing center associated with core network 130.

As shown in FIG. 2, components of core network 130 may include a TSCTSF 235, an AMF 240, a User Plane Function (UPF) 245, a Session Management Function (SMF) 250, a Unified Data Management (UDM) 255, a Policy Control Function (PCF) 260, an Authentication Server Function (AUSF) 265, a Network Exposure Function (NEF) 270, and an NWDAF 275. In some implementations, DS-TT 215 and NW-TT 225, and/or AF 230 may also be considered part of core network 130.

A 5GS (e.g., including RAN 120 and core network 130 components) may be integrated with TSN systems 210/220 as a TSN bridge 205. The logical TSN bridge 205 includes TSN translator functionality for interoperation between TSN Systems 210/220 and the 5GS both for the user plane and the control plane. The translator functionality is included in DS-TT 215 and NW-TT 225. The 5GS provides TSN ingress and egress ports via DS-TT 215 and NW-TT 225. AF 230 may request time sensitive communication and time synchronization services. In instances where AF 230 is outside of core network 130 and/or not a trusted device, NEF 270 may expose to AF 230 the 5GS capability to support the (g)PTP based time synchronization service. In instances where AF 230 is a trusted device, AF 230 may by-pass NEF 270 to communicate directly with TSCTSF 235. TSCTSF 235 may control DS-TT 215 and NW-TT 225 and may support TSC assistance container-related functionalities.

AMF 240 may perform registration management, connection management, reachability management, mobility management, lawful intercepts, Short Message Service (SMS) transport, session management message transport between UE device 110 and SMF 250, access authentication and authorization, location services management, functionality to support non-3GPP access networks, and/or other types of management processes.

UPF 245 may maintain an anchor point for intra/inter-RAT mobility, maintain an external Packet Data Unit (PDU) point of interconnect to a particular data network 140 (e.g., TSN 220), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN 120 node (e.g., wireless access station 125), and/or perform other types of user plane processes.

SMF 250 may perform session establishment, session modification, and/or session release, perform IP address allocation and management, perform Dynamic Host Configuration Protocol (DHCP) functions, perform selection and control of UPF 245, configure traffic steering at UPF 245 to guide the traffic to the correct destinations, terminate interfaces toward PCF 260, perform lawful intercepts, charge data collection, support charging interfaces, control and coordinate charging data collection, perform downlink data notification, manage roaming functionality, and/or perform other types of control plane processes for managing user plane data.

UDM 255 may maintain subscription information for UE devices 110, manage subscriptions, generate authentication credentials, handle user identification, perform access authorization based on subscription data, perform NF registration management, maintain service and/or session continuity by maintaining assignment of SMF 250 for ongoing sessions, support SMS message delivery, support lawful intercept functionality, and/or perform other processes associated with managing user data.

PCF 260 may support policies to control network behavior, provide policy rules to control plane functions (e.g., to SMF 250), access subscription information relevant to policy decisions, perform policy decisions, and/or perform other types of processes associated with policy enforcement. AUSF 265 may perform authentication. For example, AUSF 270 may implement an Extensible Authentication Protocol (EAP) authentication server and may store authentication keys for UE devices 110.

NEF 270 may expose capabilities and events to other NFs, including third party NFs, AFs, edge computing NFs, and/or other types of NFs. Furthermore, NEF 270 may secure provisioning of information from external applications to core network 130, translate information between core network 130 and devices/networks external to core network 130, support a Packet Flow Description (PFD) function, and/or perform other types of network exposure functions, including exposing capabilities of TSCTSF 235, as described above.

NWDAF 275 may include a network device that may provide functions and/or services specified by a standards entity (e.g., 3GPP, etc.) and/or of a proprietary nature. NWDAF 275 may collect analytics information associated with RAN 120 and/or core network 130. For example, NWDAF 275 may collect accessibility KPIs (e.g., a Radio Resource Control (RRC) setup success rate, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), availability KPIs (e.g., radio network unavailability rate, etc.), and/or other types of transport network KPIs. Additionally, NWDAF 275 may include logic that supports collection and distribution of TSN analytics. As described further herein, NWDAF 275 may use an NWDAF-TSCTSF interface 280 to request and collect TSN-related KPIs/data from TSCTSF 235.

Although FIG. 2 shows certain components of network portion 200, in other implementations, network portion 200 may include fewer components, different components, differently arranged components, or additional components than depicted in FIG. 2. For example, although not illustrated in FIG. 2, core network 130 may include other network functions, such as a Charging Enablement Function (CEF), a Network Repository Function (NRF), a Network Slice Selection Function (NSSF), a Network Slice Selection Function (NSSF) OAMs, etc. Additionally or alternatively, one or more components of network portion 200 may perform functions described as being performed by one or more other components of network portion 200. Furthermore, while particular interfaces (e.g., N1, N2, N3, N30, N84, etc.) are illustrated with respect to particular function nodes in FIG. 2, some network functions may include a reference point architecture that includes point-to-point interfaces between particular function nodes.

Figure 3:
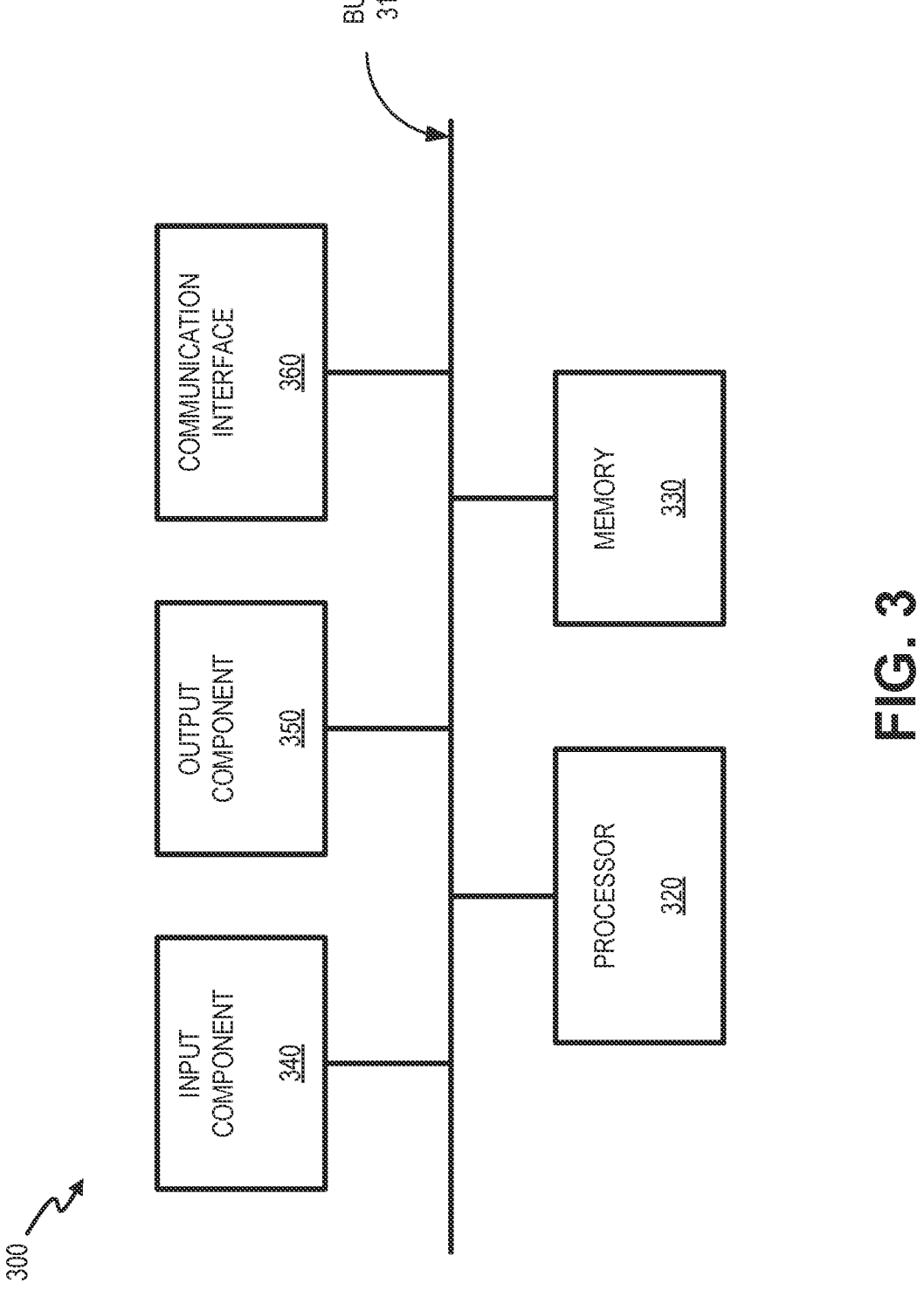
FIG. 3 is a diagram of example components of a device according to an implementation described herein.

FIG. 3 illustrates example components of a device 300 according to an implementation described herein. UE device 110, wireless access station 125, network device 135, DS-TT 215, NW-TT 225, AF 230, TSCTSF 235, AMF 240, UPF 245, SMF 250, UDM 255, PCF 260, AUSF 265, NEF 270, and NWDAF 275 may each include one or more devices 300. Device 300 may include a bus 310, a processor 320, a memory 330, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of RF signals. For example, communication interface 360 may include one or more antennas to transmit and/or receive RF signals over the air. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer components, additional components, different components, or differently arranged components than those depicted in FIG. 3. For example, device 300 may include one or more switch fabrics instead of, or in addition to, bus 310. Additionally, or alternatively, one or more components of device 300 may perform one or more tasks described as being performed by one or more other components of device 300.

Figure 4:
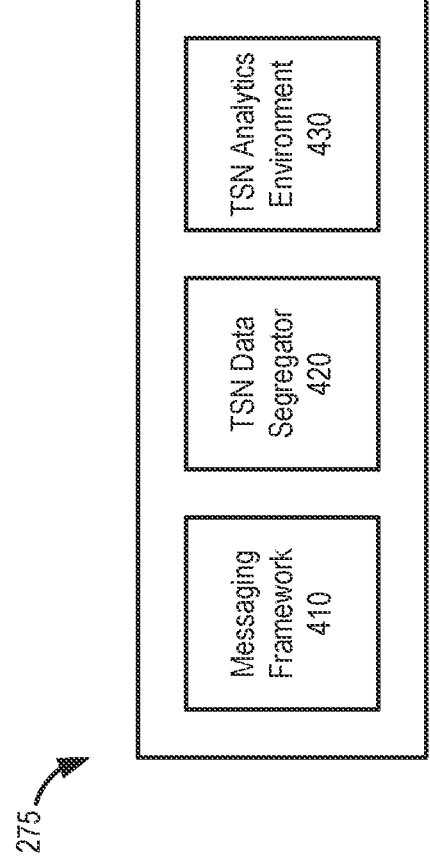
FIG. 4 is a block diagram showing example logical components of a Network Data Analytics Function (NWDAF) for TSN analytics.

FIG. 4 is a block diagram illustrating some logical components of NWDAF 275 to support a TSCTSF interface. NWDAF 275 may generate analytic reports and provide requested reports to different types of network functions (referred to herein as "consumers" or "NF consumers"). As shown in FIG. 4, NWDAF 275 may include a messaging framework 410, TSN data segregator 420, and a TSN analytics environment 430. According to other exemplary embodiments, NWDAF 275 may include additional, different, and/or fewer components. For example, NWDAF 275 may include a data collection coordination function (DCCF), an analytics data repository function (ADRF), and/or another type of component that may facilitate data collection, analytic, and/or subscription services. The components of FIG. 4 may be implemented, for example, by processor 220 in conjunction with memory 230.

Messaging framework 410 may manage standardized interfaces to allow NF consumers to subscribe to and unsubscribe from different analytic events. For example, NWDAF 275 may receive, via messaging framework 410, an analytics request from a NF consumer (e.g., PCFs, NSSF, AMF, SMF, UDMs, AF, OAM, or CEF). The analytics request may be part of a request-response model or a subscription-notification model. The analytics request may include, for example, a Nnwdaf_AnalyticsSubscription_Subscribe message, a Nnwdaf_AnalyticsSubscription_Unsubscribe message, or an Nnwdaf_AnalyticsInfo_Request message. The analytics request may further include an analytics identifier that may correspond to TSN analytics (e.g., requiring event data from a TSCTSF). Thus, messaging framework 410 modifies existing NWDAF interfaces with NF consumers to request TSN-related analytics. Messaging framework 410 may also use standardized interfaces to notify NF consumers that have a subscription about corresponding observed events. For example, messaging framework 410 may provide an Nnwdaf_AnalyticsSubscription_Notify message when a requested analytics report is available.

To support these analytics requests, messaging framework 410 may use new interfaces (e.g., interface 280) to extract events from TSCTSF when operators deploy TSN for a given slice type in private and public networks. For example, messaging framework 410 may support data collection from TSCTSF via standardized event exposure messages (e.g., Ntsctsf_EventExposure_Subscribe, Ntsctsf_EventExposure_Request, Ntsctsf_EventExposure_Unsubscribe, etc.). Event exposure messages may request (e.g., from TSCTSF 235) TSN data, such as (g)PTP functionalities of DS-TT 215 and NW-TT 225, port states of NW-TT 225, clock parameters for NW-TT 225 and DS-TT 215, QoS/5QI and TSC Assistance container information based on an individual traffic pattern, and/or abnormal behavior information. Messaging framework 410 may also use standardized interfaces to receive responses from a TSCTSF about corresponding TSN data. For example, messaging framework 410 may receive (e.g., from TSCTSF 235) an Ntsctsf_EventExposure_Notify message when a requested TSN event data is available.

TSN data segregator 420 may provide for segmentation of TSN data. For example, TSN data segregator 420 may identify a data source (e.g., TSCTSF 235), an Ultra-Reliable Low-Latency Communication (URLLC) feature indication, or another type of TSN indicator for incoming TSN data. TSN data segregator 420 may direct incoming TSN data to TSN analytics environment 430.

TSN analytics environment 430 may include a secure network location, such as an isolated storage location, a secure enclave, trusted execution environment, or another construct that is isolated from other network data. TSN analytics environment 430 may include machine learning components and analytics models for TSN analytics. In one implementation, TSN analytics environment 430 may be executed in isolated containers and use secure applications.

Figure 5:
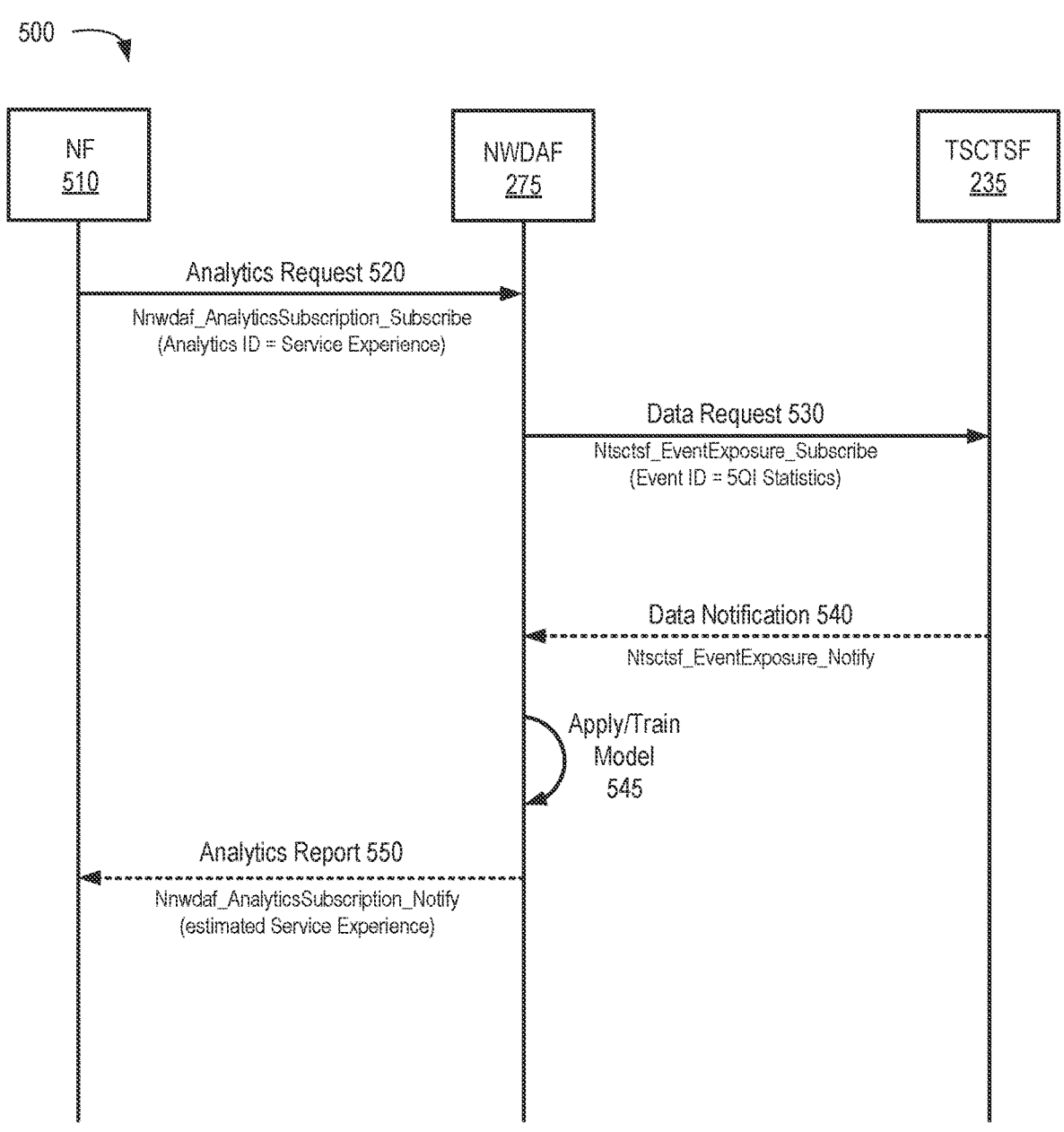
FIG. 5 is a signal flow diagram illustrating communications to provide an analytics report that includes data from a Time Sensitive Communication Time Synchronization Function (TSCTSF)

FIG. 5 is a signal flow diagram illustrating communications in a portion 500 of network environment 100 to provide an analytics report that includes data from a TSCTSF. As shown in FIG. 5, network portion 500 may include TSCTSF 235, NWDAF 275, and a commissioning network function (NF) 510. NF 510 may correspond to one or more network devices 135. Communications in FIG. 5 reflect a subscription-based notification model for NWDAF analytics. Communications shown in FIG. 5 provide simplified illustrations of communications in network portion 500 and are not intended to reflect every signal or communication exchanged between devices/functions. For example, in other implementations a request-response model may be used instead of a subscription-notification model.

As shown in FIG. 5, commissioning NF 510 (also referred to as a NF consumer) may subscribe to a TSN analytics service from NWDAF 275. For example, AF 230 may request analytics for time sensitive communication and time synchronization services on a TSN slice between TSN system 220 and TSN system 210. Commissioning NF 510 may send an analytics request 520 (e.g., a Nnwdaf_AnalyticsSubscription_Subscribe message) to NWDAF 275. Analytics request 520 may include an analytics identifier for a particular service that requires data from TSCTSF 235. The analytics identifier may correspond to a TSN session service experience, for example. In other implementations, commissioning NF 510 may correspond to another network function, and analytics request 520 may include an analytics identifier for a different service.

NWDAF 275 may receive analytics request 520 and, in response, may set up subscriptions to collect network data that supports the analytics service requested by commissioning NF 510. For example, NWDAF 275 may send a data request 530 (e.g., an Ntsctsf_EventExposure_Subscribe message) to TSCTSF 235 (e.g., a data provider) via interface 280 to subscribe to receive TSN QoS statistics from TSCTSF 235. For example, analytics request 520 may request (g)PTP functionalities of DS-TT 215 and NW-TT 225, port states of NW-TT 225, clock parameters for NW-TT 225 and DS-TT 215, QoS/5QI and TSC Assistance container information based on an individual traffic pattern, or abnormal behavior information for a group of UE devices 110 or a specific UE device 110.

In response to data request 530, data provider TSCTSF 235 may provide network data to NWDAF 275 when certain conditions are met (e.g., when a particular network QoS data is generated, etc.). For example, data provider TSCTSF 235 may send a data notification 540 (e.g., a Ntsctsf_EventExposure_Notify message) to NWDAF 275 when the requested TSN QoS data is generated. In other implementations, TSCTSF 235 may send requested data to NWDAF 273 in real time.

NWDAF 275 may receive data notifications 540 and may apply, train, and/or update an analytics model 545 that reflects a result/indicator for the requested analytics service (e.g., as requested, for example, by analytics request 520). For example, NWDAF 275 may train a service quality of experience (QoE) model relevant to commissioning NF 510 (e.g., associated with a TSN slice and/or application services associated with commissioning NF 510). In some implementations, NWDAF 275 may segregate the TSN event data from other data received by the NWDAF.

NWDAF 275 may provide an analytics report 550, based on the training model (from step 545), to commissioning NF 510. For example, NWDAF 275 may provide an estimated service experience (which may be a range of QoE values) to commissioning NF 510 using an Nnwdaf_AnalyticsSubscription_Notify message for analytics report 550. The Nnwdaf_AnalyticsSubscription_Notify message may indicate, for example, how well QoS parameters used by/for commissioning NF 510 satisfy a service level (e.g., a TSN service agreed between a mobile network operator (MNO) and the end user or between the MNO and an external application service provider). In other implementations, analytics report 550 may include other information responsive to analytics request 520 described above.

Figure 6:
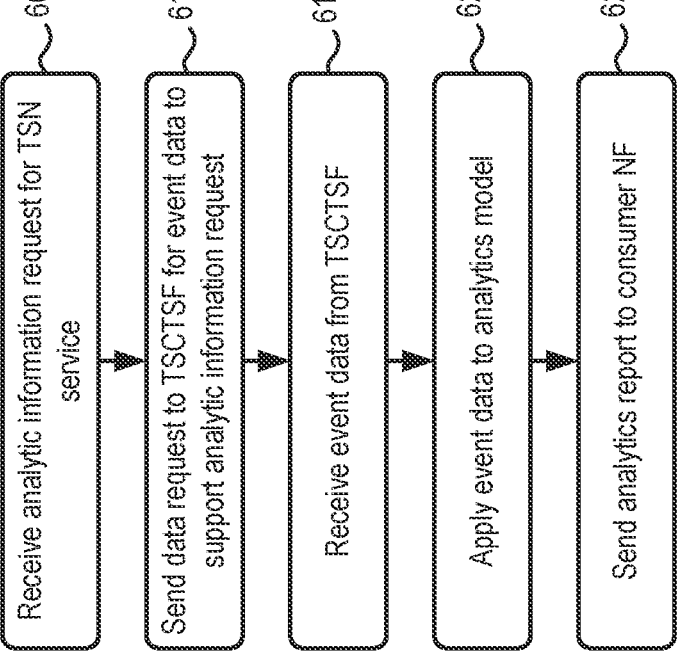
FIG. 6 is a flow diagram illustrating an example process for providing analytic reports for TSN services, according to an implementation described herein.
Figure 6:
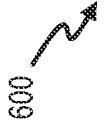

FIG. 6 is a flow diagram illustrating an example process 600 for providing analytic reports for TSN services, according to an implementation described herein. In one implementation, process 600 may be implemented by NWDAF 275. In another implementation, process 600 may be implemented by NWDAF 275 in conjunction with one or more other network devices in network environment 100.

Process 600 may include receiving an analytics request for a TSN service (block 605) and sending a data request to a TSCTSF for event data to support the analytics request (block 610). For example, AF 230 may send an analytics request (e.g., an Nnwdaf_AnalyticsSubscription_Subscribe message or an Nnwdaf_AnalyticsInfo_Request message) to NWDAF 275 to request reports associated with a TSN service. In response, NWDAF 275 may identify KPIs/data needed for the requested report and send to TSCTSF 235 a data request (e.g., an Ntsctsf_EventExposure_Subscribe message) via interface 280 to subscribe for the necessary KPIs/data.

Process 600 may also include receiving event data from the TSCTSF (block 615), applying the vent data to an analytics model (block 620), and sending the analytics report to the consumer NF (block 625). For example, in response to the data request from NWDAF 275, TSCTSF 235 may send a data response (e.g., an Ntsctsf_EventExposure_Notify message) to NWDAF 275 with the requested KPIs/data. NWDAF 275 may receive the data response and, optionally, provide segmentation to store and process data from TSCTSF 235 in a separate TSN analytics environment. NWDAF may apply an analytics model that uses the requested KPIs/data to generate an analytics report. NWDAF 275 may forward to the consumer NF (e.g., AF 230) the analytics report for the TSN service.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message/operation flows with respect to FIG. 5, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a Network Data Analytics Function (NWDAF) in a core network, an information request for a Time Sensitive Networking (TSN) service;

sending, by the NWDAF and to a Time Sensitive Communication Time Synchronization Function (TSCTSF), a data request, based on the information request, to subscribe to receive TSN quality of service (QoS) statistics from the TSCTSF;

collecting, by the NWDAF and from the TSCTSF, event data responsive to the data request;

segregating, by the NWDAF, the collected event data in a separate analytics environment that is isolated from other network data received by the NWDAF; and generating, by the NWDAF, an analytics report based on the collected event data, and at least one of:

wherein the information request identifies a TSN slice type, or wherein the collected event data includes a port state of a Network Side TSN Translator (NW-TT).

2. The method of claim 1, further comprising:

sending, by the NWDAF, the analytics report to a network function via a standardized interface.

3. The method of claim 1, wherein receiving the information request includes receiving an NWDAF analytics request for one of a request-response model or a subscription-notification model.

4. The method of claim 1, wherein sending the data request includes sending the data request to the TSCTSF via a standardized interface.

5. The method of claim 1, wherein the segregating further comprises:

directing the collected event data into one of a secure enclave or a trusted execution environment.

6. The method of claim 1, wherein generating the analytics report includes:

generating the analytics report in an isolated TSN analytics environment of the NWDAF.

7. The method of claim 1, wherein the collected event data includes Generalized Precision Time Protocol ((g) PTP) functionalities of a Device Side TSN Translator (DS-TT) and a Network Side TSN Translator (NW-TT).

8. A network device comprising:

a processor configured to:

receive, by a Network Data Analytics Function (NWDAF) in a core network, an information request for a Time Sensitive Networking (TSN) service;

send, to a Time Sensitive Communication Time Synchronization Function (TSCTSF), a data request, based on the information request, to subscribe to receive TSN quality of service (QoS) statistics from the TSCTSF;

collect, from the TSCTSF, event data responsive to the data request;

segregate the collected event data in a separate analytics environment that is isolated from other network data received by the NWDAF; and generate an analytics report based on the collected event data, and at least on of:

wherein the information request identifies a TSN slice type, or wherein the collected event data includes a port state of a Network Side TSN Translator (NW-TT).

9. The network device of claim 8, wherein the processor is further configured to:

send the analytics report to a network function via a standardized interface.

10. The network device of claim 8, wherein when receiving the information request, the processor is further configured to:

receive an NWDAF analytics request for one of a request-response model or a subscription-notification model.

11. The network device of claim 8, wherein when sending the data request, the processor is further configured to:

send the data request to the TSCTSF via a standardized interface.

12. The network device of claim 8, wherein, when segregating the event data, the processor is further configured to:

direct the collected event data into one of a secure enclave or a trusted execution environment.

13. The network device of claim 12, wherein, when generating the analytics report, the processor is further configured to:

generate the analytics report in an isolated TSN analytics environment of the NWDAF.

14. The network device of claim 8, wherein the collected event data includes clock parameters for a Device Side TSN Translator (DS-TT) and a Network Side TSN Translator (NW-TT).

15. A non-transitory computer-readable medium containing instructions executable by at least one processor, the computer-readable medium comprising the instructions for:

receiving, by a Network Data Analytics Function (NWDAF) in a core network, an information request for a Time Sensitive Networking (TSN) service;

sending, by the NWDAF and to a Time Sensitive Communication Time Synchronization Function (TSCTSF), a data request, based on the information request, to subscribe to receive TSN quality of service (QoS) statistics from the TSCTSF;

collecting, by the NWDAF and from the TSCTSF, event data responsive to the data request;

segregating, by the NWDAF, the collected event data in a separate analytics environment that is isolated from other network data received by the NWDAF; and generating, by the NWDAF, an analytics report based on the collected event data, and at least one of:

wherein the information request identifies a TSN slice type, or wherein the collected event data includes a port state of a Network Side TSN Translator (NW-TT).

16. The non-transitory computer-readable medium claim 15, further comprising instructions for:

generating the analytics report in an isolated TSN analytics environment.

17. The non-transitory computer-readable medium claim 15, further comprising instructions for:

sending, by the NWDAF, the analytics report to a network function via a standardized interface.

18. The non-transitory computer-readable medium claim 15, wherein the collected event data includes clock parameters for a Device Side TSN Translator (DS-TT).

19. The non-transitory computer-readable medium claim 15, wherein the instructions for receiving the information request include instructions for:

receiving an NWDAF analytics request for a subscription-notification model.

20. The non-transitory computer-readable medium claim 15, wherein the instructions for segregating the event data include instructions for:

directing the collected event data into one of a secure enclave or a trusted execution environment.

* * * * *